Dec. 8, 1942.  A. E. ANDERSON  2,304,746
PULSATOR FOR MILKING MACHINES
Filed June 13, 1941  2 Sheets-Sheet 1
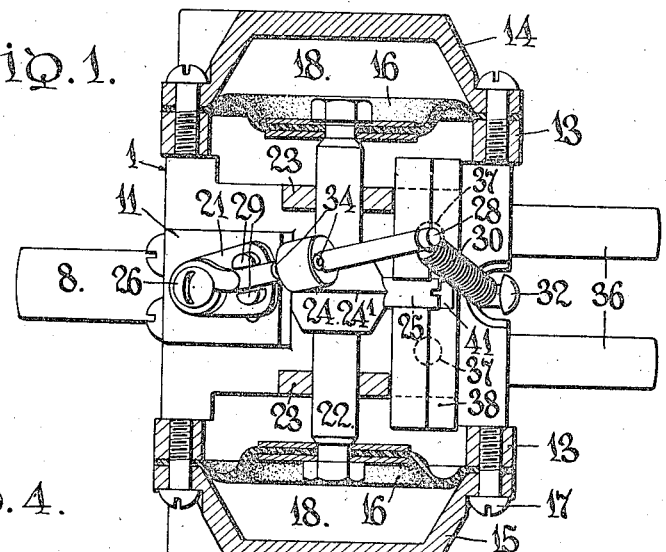
Fig. 1.
Fig. 4.
Fig. 3.
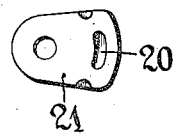
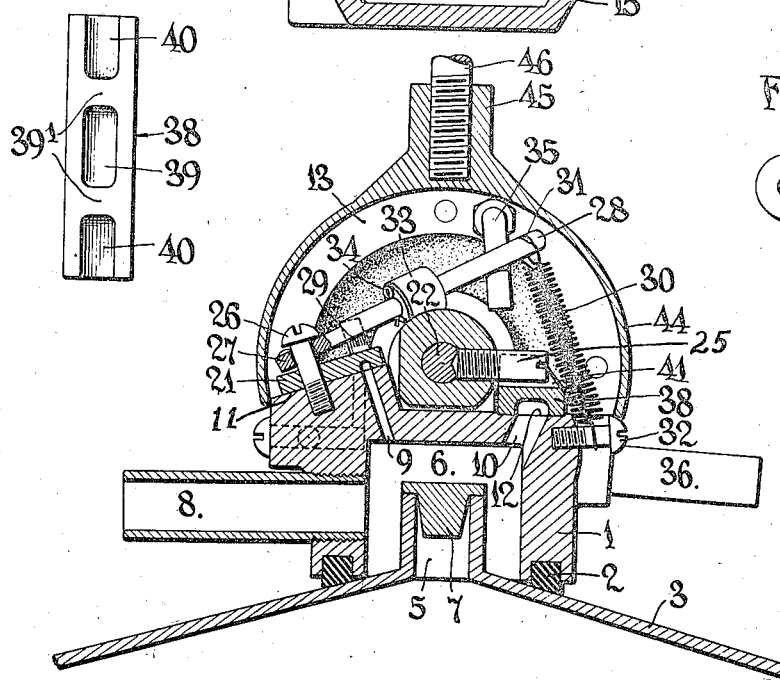
Fig. 2.
INVENTOR
Austin E. Anderson,
BY
Beau, Brooks, Buckley + Beau.
ATTORNEYS

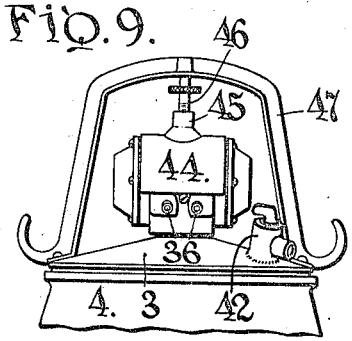
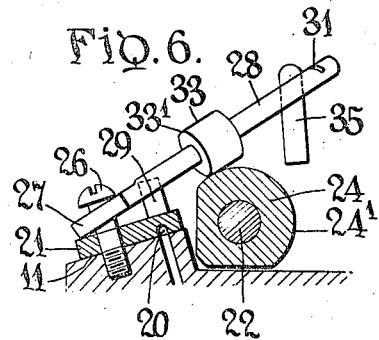
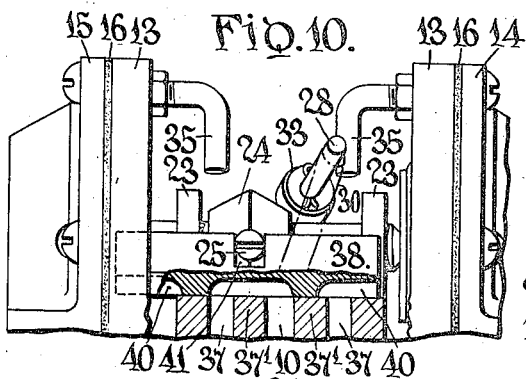
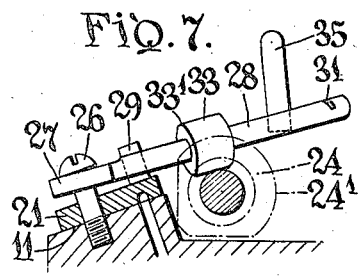
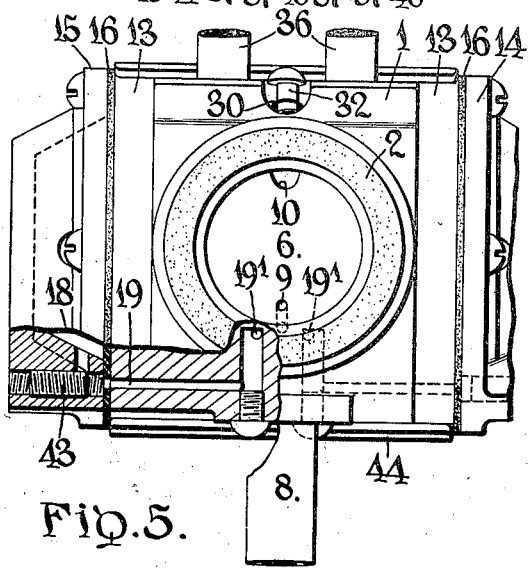
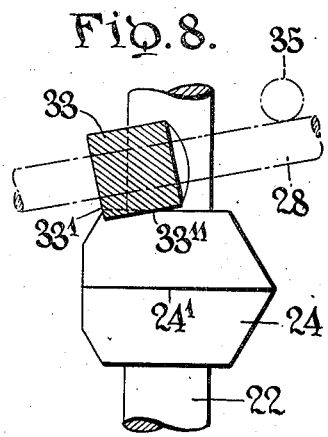

Patented Dec. 8, 1942

2,304,746

UNITED STATES PATENT OFFICE 2,304,746

PULSATOR FOR MILKING MACHINES

Austin E. Anderson, Jamestown, N. Y., assignor to Anderson Milker Co. Inc., Jamestown, N. Y.

Application June 13, 1941, Serial No. 397,900

20 Claims. (Cl. 31—62)

This invention relates to a milking machine for dairy farm use and more particularly to the pulsator mechanism thereof and it has for its object to provide a simplified and durable construction for the alternating or valve shifting mechanism by which the efficiency and practicability of the pulsator is materially enhanced and improved, and while the pulsator which is in the form of a fluid motor is described herein in conjunction with a milking apparatus, it is not the intention thereby to restrict its field of use since it is believed obvious that the inventive principles involved are susceptible of being incorporated in other physical embodiments which are adaptable for usage in other fields.

A further object of the invention is to provide an improved pulsator wherein the intervals of application of the two pressures may be regulated accurately as to duration and in a dependable manner and also vary the number of strokes per minute in accordance with the desires of the user.

The invention further aims to provide a pulsator which is of practical design so that it may be readily cleaned and easily installed in the machine, as will more fully appear from the following description, reference being made to the accompanying drawings, wherein Fig. 1 is a longitudinal sectional view through the pulsator depicting the valve action lever riding up the actuator;

Fig. 2 is a transverse cross sectional view thereof showing in fragment the upper portion of the milk pail cover;

Fig. 3 is a detailed bottom plan view of the motor valve;

Fig. 4 is a similar view of the milking or pulsation-imparting valve;

Fig. 5 is a bottom plan view of the pulsator partially broken away;

Figs. 6, 7 and 8 are diagrammatic views more clearly showing the valve action of the pulsator;

Fig. 9 is an elevation depicting the pulsator mounted upon a milk pail ready for use; and Fig. 10 is a fragmentary front elevation of the pulsator with the cover removed.

Referring more particularly to the drawings, the pulsator comprises a chambered body 1 open at its underside and provided with a suitable gasket 2 for an air tight fit on the cover 3 of a milk pail 4, the cover having an exhaust pipe 5 extending into the body chamber 6 and being normally closed by a check valve 7. The chamber 6 is placed in communication with a source of suction or operating pressure through a supply nipple 8. Also leading from the chamber 6 is a motor supply port 9 and a teat cup supply port 10 opening respectively through valve seats 11 and 12. The body 1 is provided with oppositely disposed open frame members 13 upstanding from the body and designed for supporting opposed motor casings or heads 14 and 15. The frame members may be cast integrally with the body in the form of loops or rings against the outer faces of which are clamped the margins of the diaphragms 16 by the motor heads, the latter being rendered removable by suitable fasteners 17. The removable heads 14 and 15 are hollowed to form chambers 18 which are closed by the diaphragms 16 and which communicate through ducts 19 with ports 19' in the valve seat 11, the relative arrangement of the ports 9 and 19' being such that a recess 20 in the underside of the shiftable valve 21 will connect the supply port 9 to one of the chamber ports 19' while venting the companion chamber port to the atmosphere. The two diaphragms or movable walls 16 are connected by a rod 22 which is slidably mounted in suitable guides 23 on the body 1 and is employed to actuate an automatic valve action.

The valve action is illustrated in the form of a double cone shaped actuator 24 which is fixed on the rod 22 between the guides 23, the securement being detachably effected by a screw 25 to facilitate assembling and dismantling the motor for purposes of repair. The valve 21 is mounted on a pin or screw 26 which not only provides pivotal support for the valve but also for a valve actuating lever 28. The lever has a terminal eye 27 loosely receiving the pin to afford a limited amount of vertical play along with the lateral pivoting. The lever 28 lies between a pair of upstanding lugs 29 on the back of the valve and also extends tangentially of the actuator 24, riding up and down on the cam faces of the latter as the connecting rod reciprocates therebeneath. This riding action is against the urge of a spring 30 which engages in a kerf 31 in the outer end of the lever and extends laterally therefrom to an anchoring screw 32. This disposes the line of spring force substantially at right angles or perpendicular to the lever. To facilitate the riding action of the lever a roller 33 is journaled thereon and this may be positionally confined in a suitable manner, as by a pair of pins 34.

The operation of the valve snap action is unique. A somewhat universal mounting is given for the lever, permitting the same to swing about the axis of the pin 26 and also to swing in a plane normal to the valve seat 11 during which latter motion the lever slides between the upstanding lugs 29 to accommodate the rise and fall of the roller 33 on the side faces of the actuator 24. The spring 30 is normally mounted under a slight tension which increases as the roller 33 rides up one side of the actuator and as the roller rides over the high point or ridge 24' the fully tensioned spring will immediately act to effect a rapid descent of the roller down the opposite side which effects a shifting of the motor valve and a consequential reversal of the fluid pressure differential on the diaphragm piston.

In this connection it will be observed that the lever 28 has a power arm of a fixed length extending from the pivot axis 26 to the point of spring connection and that the spring is always pulling laterally without passing through a position of dead center with respect to the valve pivot. Therefore, the spring will never become arrested in such a position. The length of the work arm is variable by reason of the fact that when the roller rides over the ridge 24', the lever is tilted up so high that the heel or inner end 33' of the roller engages the same but as the roller descends it rides down a conical surface of progressively decreasing diameter and brings the roller tangential to the cone with a point of contact a correspondingly greater distance from the screw 26, or to a point substantially midway of the length of the roller, as shown at 33" in Fig. 8. Consequently, the lever advantage is maximum or greatest when the work arm is shortest, as when the heel of the roller supports the lever, at which time the urge of the spring is greatest. Since this downward riding of the lever produces a sidewise motion of a substantially uniform speed throughout and since this lateral movement is effective on the motor valve it is obvious that the valve will be quickly shifted under a spring force acting just about normal to the lever.

The movement of the lever to its elevated or position of maximum spring tension is confined to a plane perpendicular to the connecting rod 22 by either one or the other of a pair of vertical guides 35. These may be in the form of a bent rod threaded into the frame member and having a stop part depending into the path of the outer end portion of the lever 28 to guide the latter during its rise as the actuator moves therebeneath. The guides are adjustable by reason of their threaded attachment and will therefore regulate the extent of downward travel of the spring urged roller 33.

The body is provided with one or more nipples 36 each in communication with a corresponding port 37 in the seat 12, and slidably mounted on this seat is a pulsator valve 38 having a recess 39 adapted to alternately connect each port 37 to the supply port 10, the unconnected port 37 being opened to the atmosphere as by means of a valve passage 40. The valve is connected to the piston rod 22 for movement therewith, such connection being conveniently effected by the set screw 25 fitting within a transverse notch 41 in the back of the valve. Therefore as the motor piston unit moves under the action of the fluid pressure differential the nipples 36 will alternately be connected to the source of suction. Each nipple is connected by a suitable conduit (not shown) to the outer chamber of a teat cup, the inner or teat receiving chamber of the cup being maintained under constant suction by a hose connection 42 with the interior of the milk pail which in turn is exhausted of its air content through chamber 6.

The principle of operation of the inflation or pulsation type of milker is well known. It is modified herein, however, by having means for regulating the time interval for the suction action direct on the teat relative to the interval of relief. This is accomplished by the arrangement of the valve recesses 39 and 40 in cooperation with the adjustable guides or stops 35. The length of recess 39 is substantially equal to the distance between the remote edges of the supply port 10 and either cup port 37, Fig. 10, while the width of the partition 39' between the valve passages is less than the width of the partitions 37' between the ports of the valve seat. Therefore the suction communication with one cup port 37 will begin to close ahead of the preceding atmospheric communication with the companion cup port. Consequently, the atmospheric passages 40 will communicate with their respective ports 37 for a longer period of time than the suction passage 39. By bringing the stops 35 closer to each other the valve would be confined nearer to its mid position, in which latter the recess 39 would be wholly blocked by the partitions 37'. Thus, the pulsator valve may be regulated to have its recess 39 uncover more or less of the ports 37. The more restricted this uncovering the longer would be the duration of the atmospheric communication through the passages 40. Consequently, the outer chamber of the teat cup will be at atmospheric pressure to collapse the inner chamber for relief through a longer interval of time than the milking interval. This collapse will close off the direct action of the suction on the teat and relieve the latter, to the comfort of the animal.

The pulsation rate of the machine may be varied by a throttling screw or plug 43 so disposed as to regulate the size of the motor passage 19 and thereby determine the speed of motor operation. The end frame members 13 include the several working parts therebetween which may be effectively enclosed by a simple cover 44 of somewhat semi-cylindrical form with its margins adapted to be sprung into resilient embrace with the frame members and there be retained without the aid of special fasteners. On the top side of the enclosed unit, preferably on the removable spring cover 44, is a boss 45 adjustably receiving a strut 46 adapted to be adjusted against the underside of a bail 47 carried by the cover 3 of the milk pail whereby the pulsator may be caused to seat firmly with its packing gasket 2 on the pail cover. This strut additionally provides a handle means for withdrawing the spring closure 44 from off the frame members 13.

From the foregoing it will be observed that the pulsator is not only of practical and simple design, but that the valve action is positive and sensitively responsive to the spring urge, with the greatest lever advantage occurring at the time of maximum spring urge to expedite the valve shifting movement. The arrangement of parts facilitates repair and adjustment, while the construction affords a sturdy and durable piece of milking equipment.

The foregoing description has been given in detail for the purposes of making the disclosure, but it is obvious that the inventive principles involved are susceptible of being incorporated in other physical embodiments without departing from the scope or spirit of the invention claimed.

What is claimed is:

1. A milking machine pulsator comprising a motor having a part movable back and forth by pressure differential, with a motor valve for reversing the differential to effect reverse movement of said part, a pulsator valve actuator carried by said part and having oppositely disposed cam faces leading up to a ridge, a shifting member for the motor valve having an up and down movement and a lateral movement and operatively related to the motor valve for actuating the latter by such lateral movement, said shifting member being supported for riding up one and down the other of the cam faces as the actuator moves thereby, means confining the lever against lateral movement as it rides up one cam face while permitting such lateral movement as it rides down the other cam face, and a spring exerting a force on the shifting member to urge the latter down the other cam face after passing over the ridge to thereby effect a shifting of the motor valve.

2. A milking machine pulsator comprising a body having opposed motor chambers with associated piston members joined by a connecting member, a pulsator valve actuator movable back and forth by the connecting member and having a pair of cam faces extending in opposite directions from a high point, valve means movable back and forth between two positions for connecting the motor chambers alternately to a source of operating pressure, a lever pivoted on the body for up and down movement on the cam faces and also for lateral movement, said lever operably engaging the valve means for moving the latter during the lateral movement and having a part for riding up one cam face across the high point and down the other cam face, means confining the lever against lateral movement as it rides up said one cam face while permitting such lateral movement as it rides down said other cam face, and a spring anchored at one end to the body and having its opposite end engaged with the lever to urge the part thereof down said other cam face for effecting such lateral movement of the lever to shift the valve means.

3. A milking machine pulsator comprising a body having opposed motor chambers with associated piston members joined by a connecting member having a pair of cam faces extending in opposite directions from a high point, valve means movable back and forth between two positions for connecting the motor chambers alternately to a source of operating pressure, a lever loosely pivoted at one end on the body for riding by reason of the looseness in its mounting from one face to the other across the high point, said lever being connected to the valve means in a manner to permit such riding while at the same time operable to actuate the valve means when moved about the pivotal axis, and a coiled spring anchored at one end on the body and acting at its opposite end on the lever for being tensioned as the lever rides up one face to store up spring energy which is thereafter expended during the descent of the lever down the other face whereby the latter will serve to impart such lever movement about the pivotal axis.

4. A milking machine pulsator comprising a body having opposed motor chambers with associated piston members joined by a connecting member having a pair of cam faces extending in opposite directions from a high point, valve means movable back and forth between two positions for connecting the motor chambers alternately to a source of operating pressure, a lever mounted at one end on the body and having a swinging movement for riding from one face to the other across the high point, and another swinging movement laterally of the first swinging movement for actuating the valve means, a coiled spring anchored at one end on the body and engaged at its opposite end with the lever for being tensioned as the lever rides up one face to store up energy which is thereafter expended during the descent of the lever down the other face, said other face acting to deflect the lever and impart the lateral swinging movement thereto for so actuating the valve means, and means for constraining the rising portion of the first swinging movement of the lever substantially to a plane normal to the movement of the connecting member.

5. A pulsator for milking machines, comprising a valve action including a motor valve movable back and forth between two operative positions, an actuator movable back and forth under motive power and having oppositely facing cam portions leading to a common high point, a valve shifting member supported on the actuator for riding up one cam portion over the high point and down the other cam portion, means resiliently pressing the shifting member against the actuator to yieldingly resist its upward travel and to accelerate its downward travel, said shifting member being also supported for movement crosswise of its up and down movement for operatively shifting the valve, means confining the upward riding of the shifting member against crosswise valve shifting movement, said resilient means being energized by such confined upward movement of the shifting member, the shifting member being free to be moved crosswise by said other cam portion during the downward riding thereby to shift the valve, and a pulsator valve operable by the movement of the actuator.

6. A pulsator comprising a pulsator valve, a fluid pressure operated member connected to the valve to operate the same, a motor valve shiftable to different positions for operatively applying a fluid pressure differential to actuate said member, an actuator operable by said member, a valve shifting lever operatively connected to the motor valve and pivoted for up and down movement as well as sidewise movement, the latter movement serving to shift the motor valve, a spring exerting a downward force on the lever transversely of such sidewise movement, and means coacting with the spring during the down movement of the lever to impart such sidewise movement to the lever to shift the valve.

7. A pulsator comprising a pulsator valve, a fluid pressure operated member connected to the valve to operate the same, a motor valve shiftable to different positions for operatively applying a fluid pressure differential to actuate said member, an actuator operable by said member, a valve shifting lever operatively connected to the motor valve and pivoted for sidewise movement to shift the same, and a spring exerting a force on the lever transversely of such sidewise movement, said lever being movable in such transverse direction to tension the spring and thereafter to be spring-returned, said actuator being movable in a direction substantially parallel to that of the motor valve and having a part operable for moving the lever to tension the spring and a second part operable to shift the lever sidewise during its spring-returned movement for actuating the motor valve.

8. A pulsator comprising a pulsator valve, a fluid pressure operated member connected to the valve to operate the same, a motor valve shiftable to different positions for operatively applying a fluid pressure differential to actuate said member, an actuator operable by said member, a valve shifting lever operatively connected to the motor valve and pivoted for sidewise movement to shift the same, and a spring exerting a force on the lever transversely of such sidewise movement, said lever being movable in such transverse direction against the urge of the spring to be subsequently returned by the spring, said actuator having a pair of cam faces, one face acting on the lever to so move the latter transversely against the spring urge to tension the spring and the other cam face acting on the lever during its spring imparted movement to deflect the lever and impart thereto such valve actuating sidewise movement.

9. A pulsator comprising a body having spaced upstanding ring-like frame members, a diaphragm supported by each, chambered members clamping the diaphragms to the frame members, a connecting rod joining the diaphragms to form a piston unit operable by a pressure differential in the two chambers, valve means operatively connecting the chambers to a source of fluid pressure to reciprocate the rod and including a valve part movable back and forth, a pulsator valve movable by the rod, a lever extending transversely of the rod between the frame members and mounted for a compound pivotal movement with one movement in a plane lengthwise of the rod to shift the valve part and another movement crosswise of the rod, a spring exerting a force on the lever to urge it toward the rod, said spring being adapted to be tensioned by crosswise movement of the lever away from the rod to be subsequently returned by the spring, and an actuator carried by the rod and having oppositely facing cam portions acting alternately to so move the lever away from the rod to tension the spring and then to deflect the lever laterally during its return spring imparted movement to shift the valve part.

10. A pulsator comprising a body having spaced upstanding ring-like frame members, a diaphragm supported by each, chambered members clamping the diaphragms to the frame members, a connecting rod joining the diaphragms to form a piston unit operable by a pressure differential in the two chambers, valve means operatively connecting the chambers to a source of fluid pressure to reciprocate the rod and including a valve part movable back and forth in a direction substantially parallel to the movement of the rod, a pulsator valve movable by the rod, a lever extending transversely of the rod between the frame members and operable sidewise to shift the valve part, a spring exerting a force on the lever to urge it toward the rod, said lever also having a pivotal movement transversely of the sidewise movement for being lifted from the rod against the tension of the spring to be subsequently returned by the latter, and an actuator carried by the rod and having oppositely facing conical portions leading up to a ridge over which the lever rides tangentially from one portion to another where by reason of the variable diameter of such portions the tangential disposition of the lever will change the point of contact therewith with respect to the pivotal axis of the lever, the point of spring pressure on the lever remaining constant.

11. A pulsator comprising a chambered motor body having a piston unit operable therein by a pressure differential motor valve means including a valve part movable back and forth, a pulsator valve movable by the unit, a lever having a swinging movement to shift the valve part, said lever also having a part movable transversely of its swinging movement, a spring exerting a force on the lever transversely of its swinging movement, and an actuator movable by the unit and having oppositely facing cam portions acting in succession first to lift the lever part from its normal plane of swinging movement against the urge of the spring and then to restore the lever part whereby to cause the succeeding cam portion to impart a swinging movement to the lever about its pivotal axis during its spring imparted movement for operatively shifting the valve part.

12. A pulsator comprising a body having opposed motor chambers, a piston unit operable by a pressure differential in the two chambers, valve means arranged with space between the chambers and operatively connecting the chambers and operatively connecting the chambers to a source of fluid pressure to reciprocate the unit, a pulsator valve movable by the unit and arranged in the space between the chambers, means operable by the unit for actuating the valve means, a cover enclosing the space between the chambers to house the valve means and the pulsator valve, said cover being substantially semi-cylindrical in shape with side margins being sprung over the chambers in a self-securing manner, and a strut carried radially of the cover at the top side thereof for engagement with an overhanging bail on an associated milk pail.

13. A pulsator having a reciprocatory motor actuated element with oppositely facing cam portions leading up to a ridge, a motor valve, a valve shifting lever pivoted for movement about an axis transverse of the path of movement of the motor element and spring urged against the motor actuated element in a direction transversely of its movement, said lever being adapted to be pushed outwardly by one cam portion to increase the spring urge prior to riding over the ridge and down the other cam portion under the increased spring urge, said other cam portion acting to impart swinging movement to the valve shifting lever during the spring action, fixed guides at opposite sides of the lever acting to confine the outward movement of the valve shifting lever against valve shifting movement, the spacing of the guides being sufficient to permit swinging of the lever when riding down a cam portion, and means for shifting the valve by and during the swinging movement of the valve shifting lever.

14. A pulsator comprising a body having spaced upstanding ring like frame members, a diaphragm supported by each, chambered members clamping the diaphragm to the frame members, a connecting rod joining the diaphragms to form a piston unit operable by a pressure differential in the two chambers, valve means for operatively connecting the chambers to a source of fluid pressure to reciprocate the rod and including a valve part movable back and forth in a direction substantially parallel to the movement of the rod, a pulsator valve movable by the rod, a lever extending transversely of the rod between the frame members and swingable to shift the valve part, said lever also having a movement transverse of its swinging movement, a spring exerting a force on the lever to urge it transversely toward the rod, an actuator carried by the rod and having oppositely facing cam portions one acting to lift the lever with a transverse movement from its normal plane of swinging movement to tension the spring and the other cam portion acting to deflect the lever and thereby impart the valve actuating swinging movement thereto during its spring imparted return movement, and guides carried at the inner sides of the frame members to confine the lifting movement of the lever against lateral movement.

15. A pulsator comprising a body having spaced upstanding chambered members, a diaphragm supported by each, a connecting rod joining the diaphragms to form a piston unit operable by a pressure differential in the two chambers, valve means for operatively connecting the chambers to a source of fluid pressure to reciprocate the rod and including a valve part movable back and forth in a direction lengthwise of the rod, a pulsator valve movable by the rod, a lever extending transversely of the rod between the chambered members and mounted for pivotal movement to shift the valve part, a spring exerting a force on the lever to impart such angular movement thereto toward the rod, said spring also having a movement at an angle to the pivotal movement, an actuator carried by the rod and having oppositely facing cam portions acting alternately to lift the lever from its normal plane of movement to tension the spring and then to deflect the lever laterally about its pivotal axis during its spring imparted movement, and adjustable guides carried at the inner sides of the chambered members to confine the lifting movement of the lever against lateral movement, the pulsator valve having a suction passage movable between two operative positions for a maximum interval of suction, said guides acting to regulate the interval short of its maximum degree.

16. A pulsator having a reciprocatory motor actuated element with oppositely facing cam portions leading up to a ridge, a motor valve, a valve shifting member spring urged against the motor actuated element in a direction transversely of its movement and adapted to be pushed outwardly by one cam portion to increase the spring urge prior to riding over the ridge and down the other cam portion under the increased spring urge, said shifting member also having a movement laterally of its spring urged movement for actuating the valve, said other cam portion acting to impart such lateral movement to the valve shifting member duirng its spring returned inward movement whereby to shift the valve, means for shifting the valve by and during the lateral movement of the valve shifting member, and a pulsator valve operable by said motor actuated element.

17. In a pulsator, a pulsator valve, and a motor for operating the same including a motor valve, resilient shifting means for the latter back and forth and having a part movable to store up energy in a connected actuating spring, means operable by the motor to so move said part to energize the spring and then to release said part for its independent return under the power of the spring, and means engageable by said part during its return movement for imparting an angular movement thereto, said motor valve being connected to said part for being actuated thereby during its angular movement.

18. A pulsator having a reciprocatory motor actuated element with oppositely facing cam portions leading up to a ridge, a pivotally mounted valve having spaced shoulders on its back, a valve shifting lever interlocking with the shoulders to swing the valve and slidably engaging the shoulders for transverse movement toward and from the valve, said lever being mounted for such swinging and transverse movements and engaging the cam portions to be moved thereby toward and from the valve, a spring acting on the lever to hold it on the cam portions and to urge it down one cam portion after having been lifted by the other cam portion, said one cam portion acting to impart lateral movement to the valve shifting member during the spring action, and means acting to restrain the lever against swinging as it rides up a cam portion while permitting such movement as it rides down a cam portion whereby to swing the valve.

19. A motor having a reciprocatory fluid actuated element with oppositely facing cam portions leading up to a high point, a valve for operatively applying fluid pressure to the motor, said valve being movable back and forth on its seat, a valve shifting lever pivoted for movement about an axis transverse to the path of movement of the reciprocatory element and operatively connected to the valve for shifting the same by such movement, said lever also having a movement in the plane of such transverse axis toward and from the reciprocatory element, resilient means urging the lever toward said reciprocatory element, the lever to be lifted by the leading cam portion to increase the resilient urge and after passing the high point to be restored by said resilient means as the lever moves down the trailing cam portion, the latter acting to impart a valve shifting movement to the lever during such spring restored action, and a roller having a rim tracking on the cam portions, the arrangement being such that the point of tracking engagement between the roller and the cam portions shifts longitudinally of the lever to shorten the effective leverage as the roller rides up one cam portion and to lengthen the effective leverage as the roller rides down the other cam portion under the resilient urge through which latter movement the valve is actuated.

20. A pulsator comprising a body having opposing chambers, a movable wall in each chamber, a member connected to the movable walls to form a piston unit operable by a pressure differential in the two chambers, valve means for operatively conencting the chambers to a source of fluid pressure to reciprocate the wall connected member and including a valve part movable back and forth in a direction substantially parallel to the movement of the wall connected member, a pulsator valve movable by the wall connected member, a lever extending transversely of the wall connected member and swingable to shift the valve part, said lever also having a movement transverse of its swinging movement, a spring exerting a force on the lever to urge it transversely toward the wall connected member, an actuator carried by the wall connected member and having oppositely facing cam portions one acting to lift the lever with a transverse movement from its normal plane of swinging movement to tension the spring and the other cam portion acting to deflect the lever and thereby impart the valve actuating swinging movement thereto during its spring imparted return movement, and stop means adjustably arranged in the path of and at opposite sides of the lever to confine the lifting movement of the lever against lateral movement and to regulate the extent of valve actuating swinging movement of the lever during its spring imparted movement.

AUSTIN E. ANDERSON.

CERTIFICATE OF CORRECTION.

Patent No. 2,304,746.  December 8, 1942.

AUSTIN E. ANDERSON.

It is hereby certified that error appears in the printed specification of the above numbered patent requiring correction as follows: Page 4, second column, line 12, claim 12, for "with" read --in the--; line 14, same claim, strike out "and operatively connecting the chambers"; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.